(12) United States Patent
Towler (10) Patent No.: US 8,047,509 B2
(45) Date of Patent: Nov. 1, 2011

(54) VAPOR-LIQUID CONTACTING APPARATUSES WITH VORTEX CONTACTING STAGES

(75) Inventor: Gavin P. Towler, Des Plaines, IL (US)

(73) Assignee: UOP LLC, Des Plaines, IL (US)

( * ) Notice: Subject to any disclaimer, the term of this patent is extended or adjusted under 35 U.S.C. 154(b) by 381 days.

(21) Appl. No.: 12/420,402

(22) Filed: Apr. 8, 2009

(65) Prior Publication Data

US 2010/0258427 A1    Oct. 14, 2010

(51) Int. Cl.
*B01F 3/04* (2006.01)

(52) U.S. Cl. .............. 261/118; 95/219; 95/221; 95/223; 95/224; 96/301; 96/304; 96/355

(58) Field of Classification Search ............. 95/219, 95/221, 223, 224; 96/301, 303, 304, 355, 96/358; 261/118
See application file for complete search history.

(56) References Cited

U.S. PATENT DOCUMENTS

| | | | | |
|---|---|---|---|---|
| 2,847,200 A * | 8/1958 | Ung | ................. | 261/84 |
| 3,566,582 A * | 3/1971 | Yankura | ............. | 95/219 |
| 5,024,684 A | 6/1991 | Tank | ................. | 55/92 |
| 6,161,392 A | 12/2000 | Jirnov et al. | ............. | 62/87 |
| 7,390,339 B1 | 6/2008 | Warrick et al. | ............. | 55/346 |

FOREIGN PATENT DOCUMENTS

| | | |
|---|---|---|
| EP | 945943 | 1/1964 |
| EP | 1357938 | 6/1974 |
| EP | 1420807 | 1/1976 |
| EP | 1829600 | 5/2007 |
| EP | 1972379 | 9/2008 |
| GB | 2089234 A * | 6/1982 |
| RU | 2232043 | 10/2004 |

OTHER PUBLICATIONS

Kuzmin et al., "Vortex centrifugal bubbling reactor,"*Boreskov Institute of Catalysis*, 630090 Novosibirsk, pr Lavrentieva 5, Russia, Institute of Thermophysics, 630090 Novosibirsk, pr Lavrentieva 1, Russia, Novosibirsk State Technical University, 630092 Novosibirsk, Karla Marksa 20, Russia, Source: *Chemical Engineering Journal* 107 (2005) 55-62.

Conway et al., "Gas-liquid-solid operation of a vortex-ingesting stirred tank reactor," *Chemical Engineering Research and Design*, v 80, n. 8, Nov. 2002, p. 839-845.

Ragsdale, "NASA research on hydrodynamics of gaseous vortex reactor," *National Aeronautics and Space Administration—Technical Notes*, Sep. 1960, n. D-288, 41p.

Stratiev et al., "Effect of lukoil neftochim bourgas FCC unit revamp to vortex separation system riser on the unit performance," Source: *Erdoel Erdgas Kohle/EKEP*, v 121, n. 3, Mar. 2005, p. 7-10.

Inoue et al., "Effect of tip clearance on stall evolution process in a low-speed axial compressor stage," Source: *Proceedings of the ASME Turbo Expo 2004*, v 5A, Electric Power; Turbomachinery Aerodynamics; Unsteady Flows in Turbo, 2004, p. 386-394.

* cited by examiner

*Primary Examiner* — Robert A Hopkins
(74) *Attorney, Agent, or Firm* — Mark Goldberg (57) ABSTRACT

Vapor-liquid contacting apparatuses, for example reactors and distillation columns (as well as reactive distillation apparatuses), comprising a vessel with one or more vortex contacting stages, are described. The one or more stages provide high interfacial area for the effective contacting of the different phases, in addition to the effective disengagement of these phases after contacting.

19 Claims, 4 Drawing Sheets

VAPOR-LIQUID CONTACTING APPARATUSES WITH VORTEX CONTACTING STAGES

FIELD OF THE INVENTION

The invention relates to vapor-liquid contacting in reactors, fractional distillation columns, or other apparatuses which perform mass and/or heat transfer between vapor and liquid streams. The invention more specifically relates to vapor-liquid contacting apparatuses comprising one or more stages of vortex contacting.

DESCRIPTION OF RELATED ART

A significant objective throughout chemical and refining technologies is the improved efficiency of contacting between vapor and liquid phases. Currently, there are a wide variety of multi-phase reaction and separation processes which can benefit from an enhanced rate of vapor-liquid mass and/or heat transfer by increasing the interfacial area and turbulence between the contacting phases and thereby raising the mass transfer rate constant. These processes typically employ any of a wide range of conventional vapor-liquid contacting devices. Distillation processes for separating components based on their relative volatility, for example, generally rely on fractionation trays and packings to improve vapor-liquid contacting at a plurality of stages within a vessel.

In the petroleum and petrochemical industries, fractionation trays and other contacting devices are used to resolve fractions having a desired boiling point range, such as crude oil-derived products of petroleum refining and petrochemical processing, including liquefied petroleum gas, naphtha, diesel fuel and other distillate hydrocarbon fractions, etc. In some cases, contacting devices are used to separate specific compounds from others of the same chemical or functional class, for example alcohols, ethers, alkylaromatics, monomers, solvents, inorganic compounds, etc. A typical fractionation column utilizes about 10 to 250 fractionation trays at contacting stages within the column. The particular number of stages depends on the ease of the separation (relative volatility difference) and desired product purity. Often the structure of each tray in the column is similar, but it is also known that the structures may differ (e.g., alternate) with respect to vertically adjacent trays.

Traditional fractional distillation processes therefore involve multiple stages of contacting between vapor and liquid phases having overall upward and downward flows, respectively, within a vessel. At the various discreet contacting stages, components of the vapor and liquid phases are exchanged in order to achieve, or approach as closely as possible, vapor-liquid equilibrium. The resulting vapor and liquid fractions are then separated, moved in their respective directions, and contacted again with another quantity of the appropriate fluid at a different stage.

With conventional trays having perforated decks as vapor-liquid contacting devices, vapor generated at the bottom of the column rises through a large number of small perforations spread over the decking area of the tray, which supports a quantity of liquid and which may be divided into discreet regions and/or zones. The passage of the vapor through the liquid generates a layer of bubbles referred to as froth. The high surface area of the froth helps to establish a compositional equilibrium between the vapor and liquid phases on the tray. The froth is then allowed to separate into vapor and liquid. During vapor-liquid contacting, the vapor loses less volatile material to the liquid and thus becomes slightly more volatile as it passes upward through each tray. Simultaneously, the concentration of less volatile compounds in the liquid increases as the liquid separates from the froth and moves downward from tray to tray. Vapor-liquid contacting devices therefore perform the two functions of contacting the rising vapor with liquid and then allowing the two phases to separate and flow in different directions. When the steps are performed a suitable number of times (e.g., in a continuous manner) on different trays, multiple equilibrium stages of separation can be achieved, leading to the effective separation of chemical compounds based upon their relative volatility.

Many different types of vapor-liquid contacting devices including packings and trays have been developed in an effort improve such separations. Different devices tend to have different advantages. For instance, the perforated deck trays described above are efficient contacting devices, but can cause high pressure drop in a column, particularly when the deck area is relatively small, even if the fractional open area is high. Multiple downcomer trays have high vapor and liquid capacities and the ability to function effectively over a significant range of operating rates. Structured packings tend to have a low pressure drop, making them useful in low pressure or vacuum operations. Two important parameters used to evaluate the performance of any vapor-liquid contacting device such as a fractionation tray are capacity and efficiency. Capacity refers to the total amount of vapor and liquid that can be effectively contacted on, and passed to, successive trays without flooding. Efficiency refers to the effectiveness, or approach to equilibrium, of mass transfer between vapor and liquid phases, occurring from tray to tray. Importantly, in separation processes such as fractional distillation and stripping, intimate contacting between phases is beneficial only to the extent to which the resulting phases, after contacting, can then be separated or disengaged.

While the overall flow between phases in fractional distillation columns or similar separation vessels is countercurrent, many types of conventional vapor-liquid contacting devices used for contacting stages within these vessels may induce cross flow, co-current flow, or other flow orientations between the contacting phases. Contacting stages utilizing parallel flow trays, for example, are described in U.S. Pat. Nos. 5,223,183; 5,318,732; and 7,204,477. Those utilizing co-current contacting are described, for example, in U.S. Pat. Nos. 6,682,633; 5,837,105; 6,059,934; and 7,424,999. The use of an alternative vapor-liquid contacting device, which creates a vortex centrifugal bubbling layer that achieves high interfacial area per unit volume between a vapor and a liquid is described in Kuzmin, A. O. et al., "Vortex centrifugal bubbling reactor" CHEM. ENG. JOURNAL. 107: 55-62 (2005).

Improved vapor-liquid devices, especially with respect to having increased efficiency in both contacting and subsequent separation efficiency, are continually being sought.

SUMMARY OF THE INVENTION

Aspects of the invention are associated with vapor-liquid contacting apparatuses that utilize one or more contacting stages having devices for performing vortex centrifugal contacting between the vapor and liquid phases. The contacting stages and devices overcome several disadvantages associated with those currently used for generating vortex bubbling layers to carry out vapor-liquid contacting. These disadvantages include practical limitations on the range of vapor : liquid flow ratios that can be handled, which reduce the potential scope for commercial applications. Also, while conventional devices adequately separate liquid from vapor by the centrifugal action of the vortex (i.e., liquid droplets are not substantially entrained in the vapor flow leaving the device), the separation of vapor bubbles from the liquid remains problematic because the vapor flow passes through the liquid phase without the benefit of a disengagement zone for forming a degassed liquid. When used in fractional distillation, for example, the entrainment of vapor in the liquid flow reduces the stage efficiency (e.g., based on the height equivalent to a theoretical plate, HETP), or may even cause the contacting device or overall apparatus to flood, rendering it inoperable. The tendency for vapor entrainment increases with increasing liquid flow, and therefore high vapor entrainment can result in practical limits on the overall capacity of the vapor-liquid contacting device and apparatus utilizing the device.

Embodiments of the invention are therefore directed to vapor-liquid contacting apparatuses, for example reactors and distillation columns (as well as reactive distillation apparatuses), comprising a vessel with one or more vortex contacting stages. The one or more stages provide high interfacial area for the effective contacting of the different phases, in addition to the effective disengagement of these phases after contacting, such that vapor and liquid (with different final compositions relative to their initial compositions) are removed from the stage(s) with reduced entrainment of liquid and vapor, respectively, in the removed phases. The stages additionally avoid limitations of known devices operating in the vortex bubbling regime, and particularly with respect to the operable range of vapor: liquid flow ratios and maximum vapor and/or liquid flows. The vortex contacting stages and associated devices advantageously have a low pressure drop compared to those used conventional vapor-liquid contacting. Additionally, when used in reactors, distillation columns, or other vapor-liquid contacting apparatuses, the devices provide high mechanical integrity, reasonable cost, and ease of installation and inspection.

Particular embodiments of the invention are therefore directed to vapor-liquid contacting apparatuses comprising a vortex contacting stage. The vortex contacting stage comprises a contacting zone having a circular cross section, with the radius of this circular cross section generally decreasing along at least a portion of axial height of the contacting zone (i.e., the contacting zone is tapered along this axial height portion), but often having a constant circular cross section in the top portion of the contacting zone. The contacting zone is defined between a bottom surface (through which a liquid may be introduced through a liquid inlet), a tapering inner surface, and a cylindrical tangential flow directing device disposed between the bottom and inner surfaces. The tangential flow directing device is generally located at or near peripheral sections of the bottom surface and the tapering inner surface and provides an inlet for vapor flow into the contacting zone, for example through guiding swirl vanes that impart a tangential flow direction. Both vapor and liquid inlets, for example in tangential and axial directions, respectively, are therefore normally provided to the contacting zone, and a vapor-liquid disengagement device is used to separate the phases exiting the contacting zone.

The vapor-liquid disengagement device may comprise a circular inlet surface having an inner diameter and forming a top portion of the tapering internal surface. This inlet surface of the vapor-liquid disengagement device is in fluid communication with the contacting zone. An opposing, external outlet surface of the vapor-liquid disengagement device may, for example, be concentric with the inlet surface and have a larger, outer diameter. The external outlet surface, optionally in combination with other surfaces (e.g., a bottom outlet surface) of the vapor-liquid disengagement device may be used for removing separated (or disengaged) vapor and liquid streams from the contacting zone. In a representative embodiment, a disengaged vapor flows predominantly through the outlet surface opposite the inlet surface, while a disengaged liquid flows predominantly through the bottom outlet surface.

Other embodiments of the invention are directed to multistage vapor-liquid contacting apparatuses comprising a plurality of the vortex contacting stages, as described above, within a vertically disposed cylindrical shell of the apparatus. In the case of the multiple stages, the outlet surfaces of the vapor-liquid disengagement device of one stage are in fluid communication with both a vapor inlet of an immediately superior (higher) contacting stage and a liquid inlet of an immediately inferior (lower) contacting stage. Communication with the liquid inlet may be provided along a flow path defined by a curved outer surface, opposing the tapering inner surface defining the contacting zone, and through one or more liquid downcorners at which the curved outer surface terminates.

In a specific embodiment, which helps maintain stable vortex formation during operation, improves liquid handling capacity, simplifies construction, and reduces cost, the curved outer surface defining a portion of the flow path of liquid exiting the contacting zone terminates at a plurality of liquid downcorner segments extending in discreet sections of an annular space external to and normally surrounding the plurality of vortex contacting stages. Advantageously, the liquid downcorner segments may be disposed radially between other liquid downcorner segments of immediately inferior and/or immediately inferior vortex contacting stages. To further improve the mechanical integrity and reduce stresses on the multi-stage apparatuses described herein, the tangential flow directing devices of successive contacting stages may be arranged to swirl inlet vapors in alternating, clockwise/counterclockwise directions, so that the vortex spin direction is reversed in an alternating manner.

Further embodiments of the invention are directed to multistage vapor-liquid contacting apparatuses comprising a plurality of vortex contacting stages. Each stage has a vapor-liquid disengagement device having outlet surfaces in fluid communication with both a vapor inlet of an immediately superior vortex contacting stage and a liquid downcorner in fluid communication with a liquid inlet of an immediately inferior vortex contacting stage.

The vortex contacting stages and devices used in these stages to carry out vapor-liquid contacting as described herein, may be used in any apparatus in which contacting with high interfacial area for mass transfer, efficient phase disengagement after contacting, good performance over a broad range of vapor: liquid flow ratios and absolute flow rates, low pressure drop, and simplified fabrication are desired. One or more of the contacting stages may be used in a reactor, distillation column, an absorber, stripper, etc. In a representative embodiment, a plurality of the contacting stages are used in distillation. Additional embodiments of the invention are therefore directed to methods for contacting vapor and liquid streams. The methods comprise feeding the vapor in the vapor inlet and feeding the liquid in the liquid inlet (e.g., in Langential and axial directions, respectively) of a vortex contacting stage as described herein.

In the case of distillation methods, the vapor and liquid streams are normally internally generated during the stage-to-stage contacting, with the liquid flowing generally downward and becoming successively enriched in one or more higher boiling components and the vapor flowing generally upward and becoming successively enriched in one or more lower boiling components. Some contacting stages, however, may be fed by external streams such as a liquid reflux to the column overhead, a vapor reboiler return to the column bottoms, or a column feed as either vapor or liquid, or otherwise having both vapor and liquid fractions.

These and other embodiments relating to the present invention are apparent from the following Detailed Description.

The same reference numbers are used to illustrate the same or similar features throughout the drawings. The drawings are to be understood to present an illustration of the invention and/or principles involved. As is readily apparent to one of skill in the art having knowledge of the present disclosure, vortex contacting stages and apparatuses comprising these stages according to various other embodiments of the invention will have configurations and components determined, in part, by their specific use.

DETAILED DESCRIPTION

Figure 1:
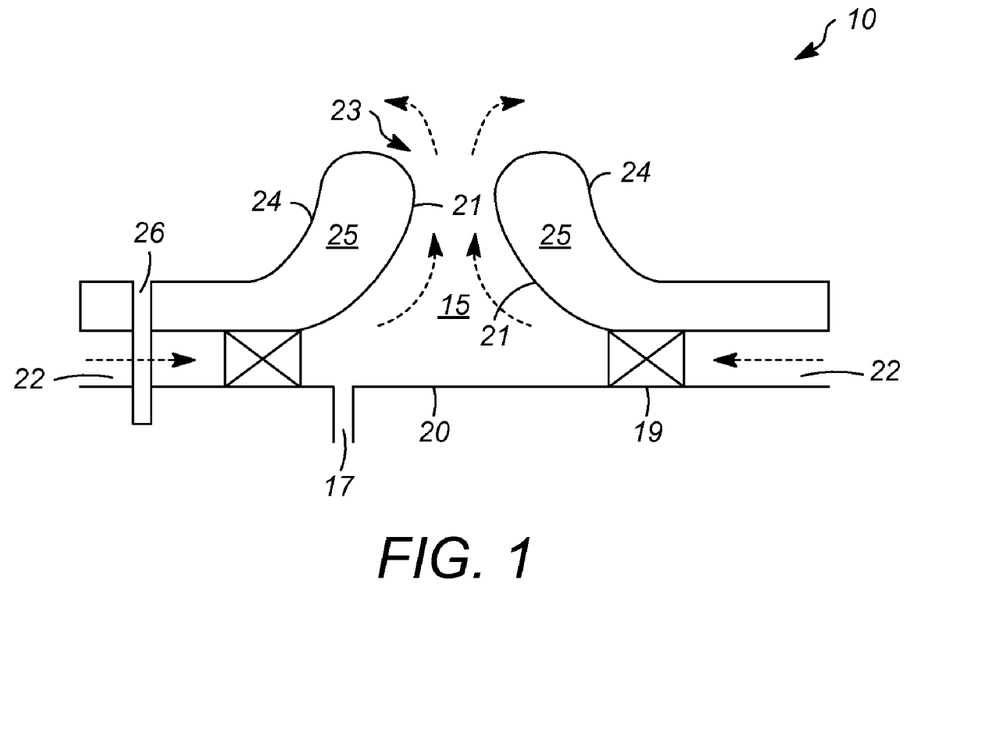
FIG. 1 is a side view of a conventional vortex contacting stage.

Aspects of the invention are associated with the discovery of improved vortex contacting stages having a number of advantages, as discussed above, in terms of their performance as well as their mechanical design and ease of installation and inspection/maintenance. FIG. 1 is a side view illustrating some basic features associated with a vortex contacting stage 10. In contacting zone 15, a spinning vortex of a highly dispersed vapor-liquid mixture can be produced and held in a field of centrifugal forces. In particular, the vortex is created in contacting zone 15 when vapor entering through vapor inlet 22 and then tangential flow directing device 19 rotates liquid entering through liquid inlet 17. A circular rotation of the entering vapor, with a rotational axis that substantially coincides with the axis of the cylindrical vessel, can be established using a tangential flow directing device 19, for example, having many guiding vanes and tangential slits arranged in a ring-shaped structure.

Contacting zone 15 has a circular cross section, with the diameter of the cross section, at axial heights above bottom surface 20, being either the distance across tangential flow directing device 19 (e.g., its inner diameter) or the distance across the opening defined by tapering inner surface 21. The cross sectional diameter of contacting zone 15 can therefore generally decrease from bottom to top in the contacting stage 10 depicted in FIG. 1. Contacting zone 15 is defined between bottom surface 20, tapering inner surface 21, and tangential flow directing device 19 disposed between these surfaces 20, 21 and proximate peripheral sections (i.e., removed from the axial center of the contacting zone 15) of these surfaces. Liquid can therefore enter contacting zone 15, in a generally axial flow direction, through liquid inlet 17 in communication with contacting zone 15 through bottom surface 20. Liquid inlet 17 is closer to the central axis of contacting zone 15 (or central axis of a vessel containing the contacting stage 10) than tangential flow directing device 19.

Circulating vapor can therefore exit contacting zone 15 through a contacting zone opening or top outlet 23 which normally has the narrowest cross section. After exiting contacting zone 15, the vapor volume is then expanded above outlet 23 to accommodate the full diameter of a vessel or container housing contacting stage 10. The centrifugal force of the circulating vapor directs any liquid carried with the vapor exiting outlet 23 to the vessel periphery, such that vapor-liquid disengagement can occur in a space of expanded diameter, above the contacting zone outlet 23. The disengaged liquid can then flow in the downward direction across a curved outer surface 24 that is external to the contacting zone 15 and opposes the tapering inner surface 21. The inner and opposing outer surfaces 21, 24 can therefore be surfaces of a flow directing baffle 25 that are generally smooth and capable of maintaining a stable, spinning vortex in contacting zone 15. The inner and opposing outer surfaces are generally curved, although straight surfaces, such as a tapering inner surface that tapers diagonally along a straight line, and/or a straight, diagonal opposing outer surface, are also possible. Swirling flow may be enhanced using additional elements such as central blade rotator (not shown), although such elements are optional. Disengaged liquid flowing back down along curved outer surface 24 can be directed to liquid drain 26.

Figure 3:
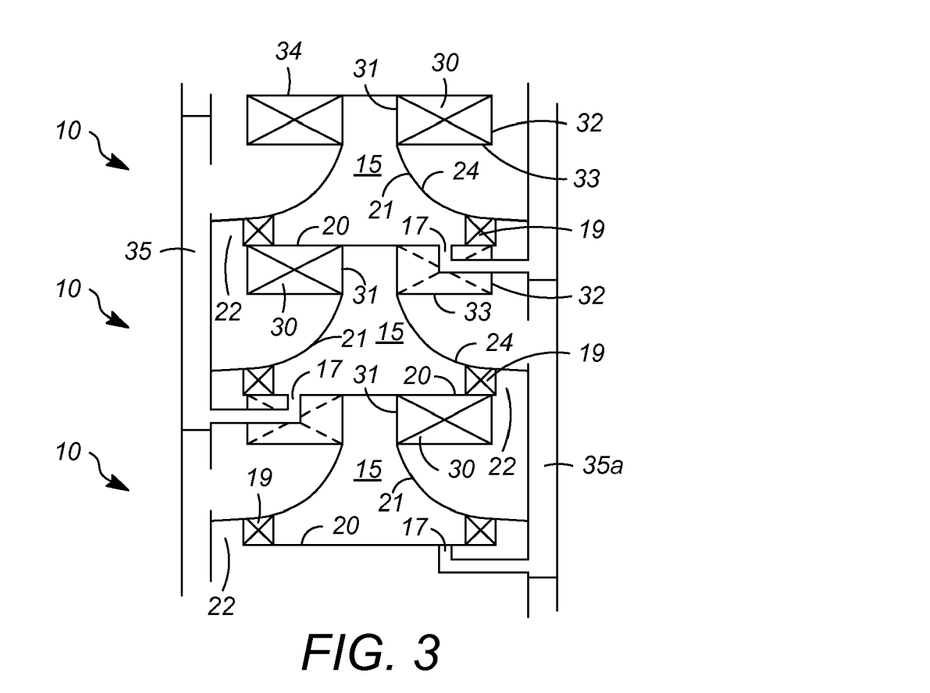
FIG. 3 is a side view of a representative vapor-liquid contacting apparatus having multiple vortex contacting stages.

Rather than relying on centrifugal forces alone to disengage vapor and liquid exiting the contacting zone, quantities undesirable entrained fluids, and particularly of entrained vapor in the disengaged liquid, are significantly reduced through the use of a vapor-liquid disengagement device, as shown, for example, in the multi-stage vapor-liquid contacting apparatus depicted in FIG. 3. Three consecutive contacting stages 10 are shown for convenience, although it is understood that the total number of stages in an apparatus such as a distillation column will often be much higher. It is possible to use other types of contacting stages (e.g., perforated deck trays) in combination with the vortex contacting stages described herein. Also, for simplicity, external inlet and outlet lines for fluid introduction and withdrawal (e.g., introduction of feed, overhead condenser liquid, and bottoms reboiler vapor or withdrawal of fractionated products) are not illustrated.

As in FIG. 1, each contacting zone 15 is defined between bottom surface 20, tapering inner surface 21, and tangential flow directing device 19, and has an associated vapor inlet 22 and liquid inlet 17. In FIG. 3, however, a vapor-liquid disengagement device 30 is shown with an inlet surface 31 that forms a top portion of the tapering inner surface 21. This inlet surface 31 of the vapor-liquid disengagement device 30 is in fluid communication with contacting zone 15. Vapor-liquid disengagement device 30, like tangential flow directing device 19, may therefore be ring-shaped. In the embodiment illustrated in FIG. 3, the inlet (or internal) surface 31 of the ring provides the smallest diameter at the top of the contacting zone 15, such that the top portion of the tapering internal surface 21, provided by the vapor-liquid disengagement device 30, is a portion of constant diameter.

In FIG. 3, unlike the vortex contacting stage of FIG. 1, fluids do not exit the contacting zone 15 axially through a top opening, but are instead diverted in a radial direction through inlet surface 31 of vapor-liquid disengagement device 30. Physical separating structures, such as demisters in the form of concentric plates (or disengagement plates), in vapor-liquid disengagement device 30 greatly benefit the separation of vapor and liquid streams after their contact, relative to the reliance on centrifugal force and gravity alone to accomplish the desired separation. In particular, the exiting fluids forced through inlet surface 31 must contact the physical separating structures before emerging through outlet surfaces 32, 33 as separated or disengaged vapor and liquid streams. Effective phase disengagement is provided in a relatively compact space.

In the embodiment shown in FIG. 3, one of these outlet surfaces is external outlet surface 32 that is concentric with inlet surface 31 and has the larger diameter of ring-shaped vapor-liquid disengagement device 30. Below external outlet surface 32 is bottom outlet surface 33 of vapor-liquid disengagement device 30. Fluid passage through inlet surface 31, external outlet surface 32, and bottom outlet surface 33 of vapor-liquid disengagement device 30 may be accomplished if these surfaces are at least partially open, for example by using perforated plates at these surfaces. In contrast, top surface 34 may be imperforate in order to prevent fluid from exiting vapor-liquid disengagement device 30 in the absence of significant contact with its physical separating structures. Also, while two separate outlet surfaces 32, 33 are illustrated in FIG. 3, it is understood that only a single outlet surface may be required in other embodiments. For example, the corner junction between external outlet surface 32 and bottom outlet surface 33 may be curved, such that separate outlet surfaces 32, 33 are no longer distinguishable.

One example of a suitable physical separating structure for use in a vapor-liquid disengagement device includes a plurality of radially stacked plates. The disengagement device can be arranged so that the plates are stacked radially such that fluid (e.g., containing both vapor and liquid fractions) exiting a contacting zone 15 flows radially outward between the stacked plates which provide surfaces and induce complexities in the fluid flow path that result in effective vapor-liquid disengagement. In one embodiment, therefore, the vapor-liquid disengagement device 30 comprises a plurality of plates in the shape of rings. These plates may be maintained in a radial arrangement about the top of the contacting zone 15, with the inner diameter of the plates forming at least part of the inlet surface of the vapor-liquid disengagement device 30.

Figure 2:
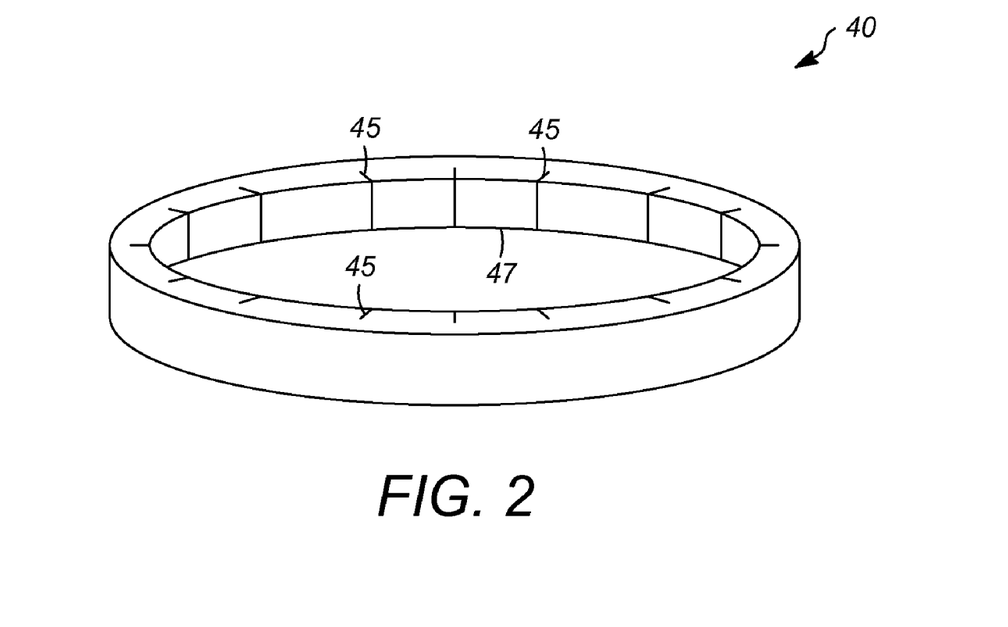
FIG. 2 is a representative outer slotted retention ring for retaining plates of a vapor-liquid disengagement device in a radial arrangement.

The radial arrangement of the plates may be maintained, according to a specific embodiment, using slotted retention rings. FIG. 2 shows a representative outer slotted retention ring 40 for securing plates, using outer slots 45, in a radial arrangement (e.g., such that the planes of these plates, if extended, would intersect at a common line that coincides with the central axis of (i) the outer slotted retention ring 40, (ii) the contacting zone 15 that the radial plates and retention rings surround, and/or the vapor-liquid contacting apparatus containing the contacting zone 15). Thus, outer slotted retention ring 40 has a plurality of machined slots 45 on its inner perimeter 47. An inner retention ring (not shown) for use in conjunction with outer slotted retention ring 40 to maintain or secure radially stacked plates would have a similar ring shape, but with a smaller inner diameter (e.g., matching the diameter of a top section of the contacting zone) and a smaller outer diameter and slots on its outer perimeter.

A number of suitable separating structures for use in the vapor-liquid disengagement device are possible. These structures include, for example, mist eliminators, such as a vane type demisters having various channels and louvers such that fluid passing through the demister must undergo several changes in direction which cause any entrained liquid droplets to impact portions of the separating structure and flow downward to the bottom of the demister. Another example of known vapor-liquid separating structures are mesh pads or woven threads. Combinations of these mist eliminator technologies can also be used. Various separating (or separation) structures for demisters, perforated and imperforate plates that cooperate with these structures, as well as the orientation of these structures and plates, are described in detail, for example, in U.S. Pat. No. 7,424,999 at column 7, lines 16 to 64 and at column 9, line 61 to column 11, line 30, this subject matter being incorporated by reference into the present disclosure.

Figure 4A:
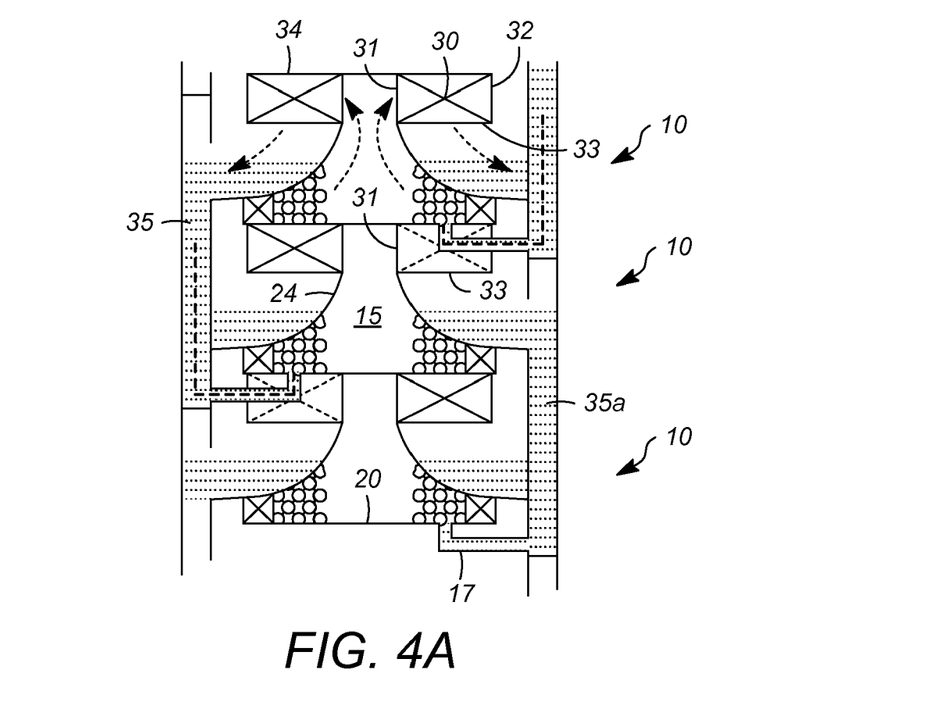
FIG. 4A shows liquid flows through the vapor-liquid contacting apparatus of FIG. 3.
Figure 4B:
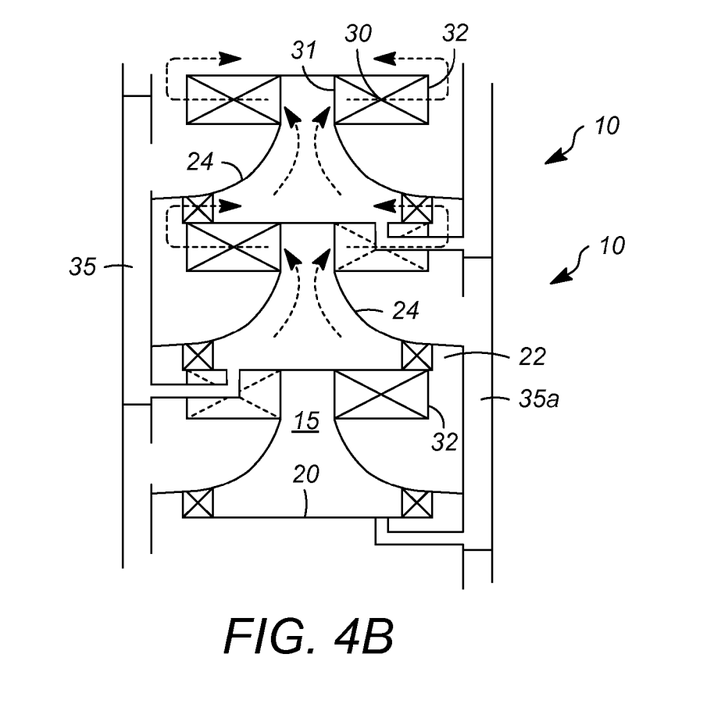
FIG. 4B shows vapor flows through the vapor-liquid contacting apparatus of FIG. 3.

The flows of liquid and vapor phases, through the contacting zones 15 in the multi-stage vapor-liquid contacting apparatus of FIG. 3, are represented in FIGS. 4A and 4B. As shown in FIG. 4A, liquid exits contacting zones 15 of each stage through respective inlet surfaces 31 of vapor-liquid disengagement devices 30. The disengaged liquid emerges predominantly through bottom outlet surfaces 33 which are in communication with curved outer surfaces 24 external to contacting zones 15 and opposing tapering inner surfaces 21. The disengaged liquid therefore drains down curved outer surfaces 24, above which is sufficient space for additional disengagement of any vapor bubbles remaining in this liquid. The liquid flow path is further defined in FIG. 4A by liquid downcorners 35 at which curved outer surfaces 24 terminate. Liquid downcorners 35 are in fluid communication with liquid inlets 17 of the respective, immediately inferior or lower vortex contacting stages. In particular, liquid downcorners 35 direct disengaged liquid exiting a vortex contacting stage, through bottom outlet surfaces 33 of vapor-liquid disengagement devices 30, to these liquid inlets 17. As illustrated in FIGS. 3, 4A, and 4B, the liquid downcorners 35 of a given vortex contacting stage can all extend in annular spaces about (or external to) their respective immediately inferior vortex contacting stages. These annular spaces may therefore be contained in an annular region of the vapor-liquid contacting apparatus that surrounds the vortex contacting stages as described herein.

FIG. 4B illustrates the flow of vapor through vortex contacting stages 10. In particular, vapor exiting contacting zone 15 flows through inlet surface 31 of vapor-liquid disengagement device 30 and carries entrained liquid. Disengaged vapor, having a substantially reduced content of entrained liquid, then emerges from this device 30 predominantly through external outlet surface 32 that opposes inlet surface 31 and has a larger diameter than inlet surface 31 (e.g., with the opposing surfaces 31, 32 being concentric, inner and outer surfaces of a ring-shaped vapor-liquid disengagement device 30). External outlet surface 32 of vapor-liquid disengagement device 30 is in fluid communication with vapor inlet 22 of the immediately superior or higher vortex contacting stage 10.

Aspects of the invention are associated with the use of liquid downcorners as described above for the effective transfer of liquid exiting a vortex contacting stage to the proper contacting zone, namely that of the immediately inferior stage of the apparatus. In general, any entrained fraction of vapor bubbles in liquid withdrawn from a vortex contacting stage can create a tendency for flooding. To counteract this potential flooding tendency, the pipe or channel of a liquid downcorner that allows disengaged liquid to flow from a vortex contacting stage to an immediately inferior stage below must be sized large enough for self-venting flow. Suitable sizing correlations are found, for example, in Sewell, A., "Practical Aspects of Distillation Column Design", THE CHEMICAL ENGINEER, 299/300: 442 (1975), which can be used to predict the minimum required mean hydraulic diameter for the desired, self-venting flow.

In addition to proper downcomer sizing, the routing of liquid from stage to stage is further complicated by the fact that the axial symmetry of a vapor-liquid contacting apparatus and its vortex contacting stages device should be preserved to allow formation and maintenance of stable vortices. Moreover, the channels of liquid downcomers for passing liquid to successive contacting stages should ideally disperse this liquid uniformly around the vortex perimeter through liquid inlets at each stage. Enhancing symmetry advantageously provides stable operation over a wider range of flow ratios, relative to cases in which liquid enters a vortex contacting zone in a non-uniform manner about its central axis. Another consideration from a mechanical perspective is the avoidance of piping for disengaged liquid that exits and re-enters the vertical, cylindrical shell of a typical vapor-liquid contacting apparatus, as such external piping requires significant installation labor and cost.

The external annular downcomers 35 illustrated in FIGS. 3, 4A, and 4B advantageously address these considerations associated with the transfer of liquid in vapor-liquid contacting apparatuses with multiple vortex contacting stages. In operation, disengaged liquid is collected from the outer surfaces 24, which are often curved, external to contacting zones 15 and drains into an annular region or space disposed around the outside of these zones. Downcomers 35 extending in this space from various vortex contacting stages transfer disengaged liquid to the appropriate vortex contacting stage immediately below and preferably through liquid inlets disposed in a symmetrical manner about the central axis of the contracting zone 15, which is often the central axis of the vapor-liquid contacting apparatus itself.

Figure 5A:
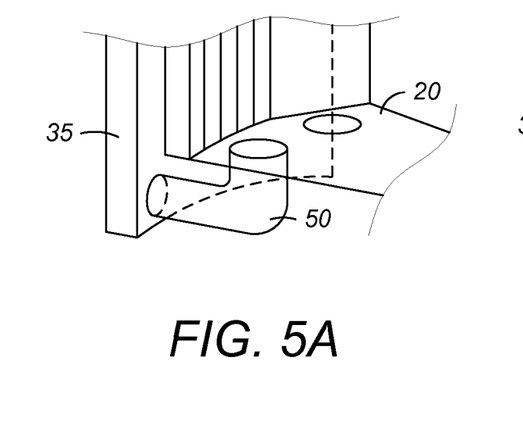
FIG. 5A depicts a terminal part of a liquid downcorner having dip pipe conduits extending therefrom and through a bottom surface to a contacting zone immediately inferior to the contacting zone feeding the liquid downcorner.
Figure 5B:
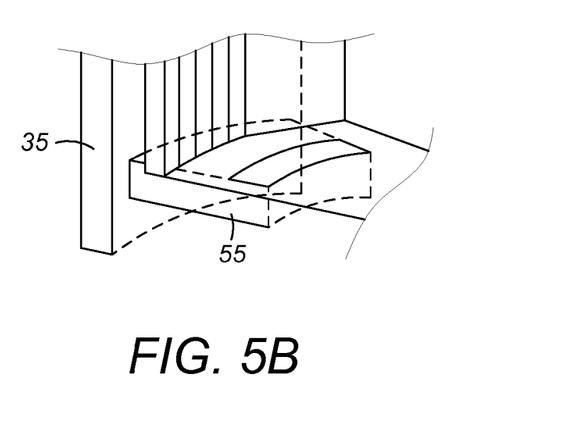
FIG. 5B depicts a terminal part of a liquid downcorner having a trough conduit extending therefrom and through a bottom surface to a contacting zone immediately inferior to the contacting zone feeding the liquid downcorner.

Specific structures for this transfer of disengaged liquid exiting downcomers 35 are shown in FIGS. 5A and 5B. These structures extend at or near a terminal part (e.g., the lower part) of the liquid downcomers 35 opposite a part (e.g., the upper part) that communicates with the outer surfaces 24 from which disengaged liquid drains into downcomers 35. More specifically, the extending structures serve as conduits for introducing some or all of the liquid, through bottom surfaces 20, to contacting zones 15. As discussed above, these liquid conduits, providing the liquid inlet 17, are preferably distributed about a central axis of their respective contacting zones 15. In the embodiment of FIG. 5A, the liquid inlet to this contacting zone, which is in a vortex contacting stage immediately inferior to that from which liquid is provided through downcorner 35, comprises one or more dip pipe conduits 50 extending from a terminal part of liquid downcomer 35. In the embodiment of FIG. 5B, the conduit extending from downcomer 35 is a trough conduit 55 that provides some or all of the liquid inlet to an immediately inferior contacting zone 15. The configuration of dip pipe conduits 50 or trough conduit 55 in FIGS. 5A and 5B is such that these conduits 50, 55 extend below bottom surface 20 that partially defines the associated contacting zone. In general, the orientation of conduits extending below bottom surface 20 and then leading upward through bottom surface 20 can provide a standing liquid level and thereby help ensure a liquid seal to prevent vapors from entering contacting zone 15 through the liquid inlet (i.e., to eliminate vapor "blow by").

In general, a plurality of liquid downcomers 35 may transfer liquid from a given vortex contacting stage to an adjacent inferior vortex stage in the annular space external to the vortex contacting stages, as discussed above. The liquid downcomers for transferring liquid between any two particular stages may therefore be in the form of liquid downcomer segments extending in discreet sections of the annular space and preferably disposed with a uniform radial or circumferential spacing in this annular space. This uniform spacing of several downcomers of a given stage can help provide good symmetry of the contacting stages. In a particular embodiment in which symmetry and effective radial distribution to the contacting zone are maintained, a plurality of conduits (e.g., dip pipes or troughs as shown in FIGS. 5A and 5B) extending from these radially spaced downcomer segments communicate with the immediately inferior contacting zone through its bottom surface at radial positions that are uniformly spaced about the central axis of the contacting zone.

Figure 6:
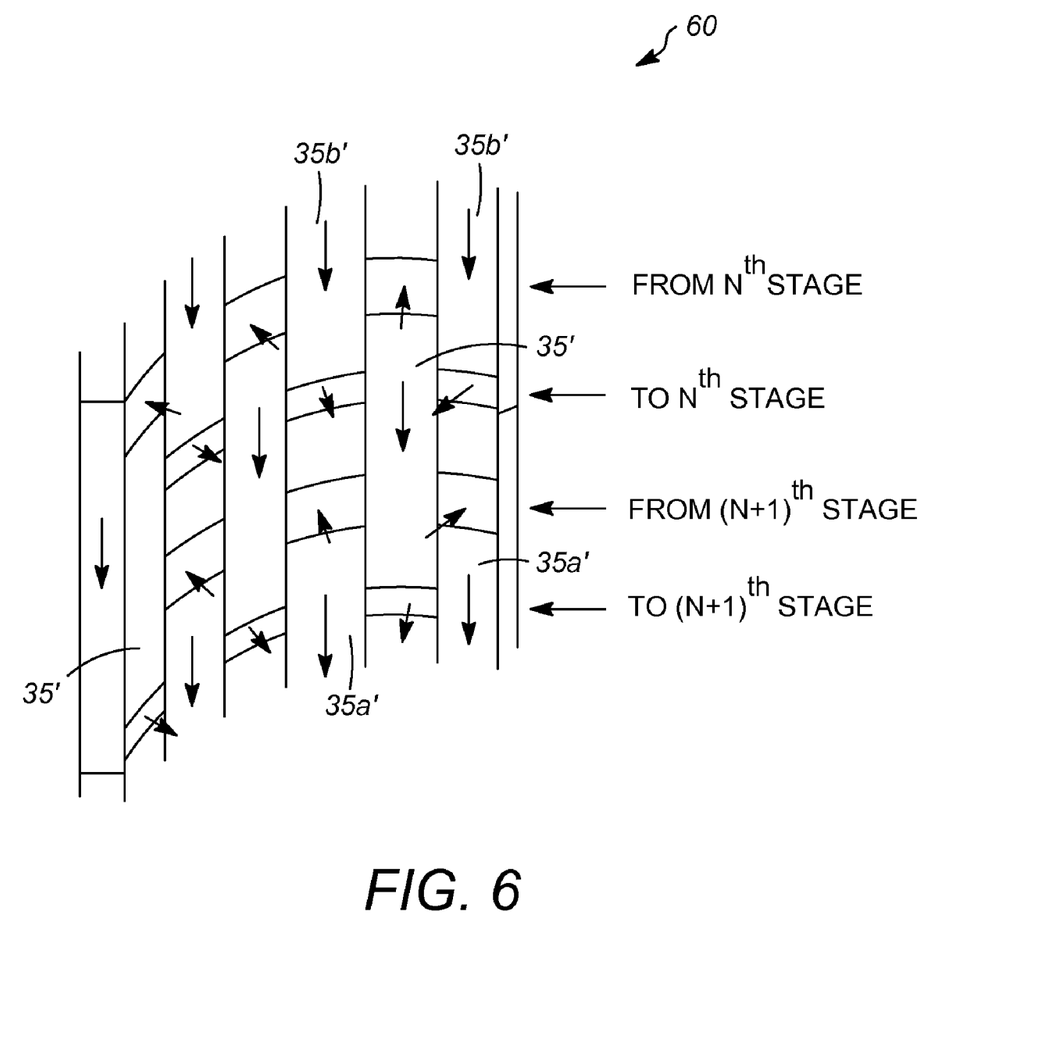
FIG. 6 depicts liquid downcorner segments extending in sections of an annular space that is external to vortex contacting stages, with the liquid flow directions shown.

Therefore, the outer surface of a given vortex contacting stage, which provides a flow path for disengaged liquid exiting a vapor-liquid disengaging device as discussed above, can terminate at a plurality of liquid downcomer segments extending in discreet radial sections disposed in an annular space external to the plurality of vortex contacting stages. As shown in FIG. 3, the bottom of the liquid downcorner 35 extends below the top of the liquid downcomer 35a of an immediately inferior contacting stage. Therefore, as illustrated in FIG. 6, the annular space 60 can be divided into segments with alternating downcomers. In particular, liquid downcomer segments 35' of a given contacting stage that extend in discreet, radially spaced apart sections of the annular space 60 are disposed radially between liquid downcomer segments 35a' of the immediately inferior vortex contacting stage and liquid downcomer segments 35b' of the immediately superior vortex contacting stage. Horizontal arrows in FIG. 6 illustrate the representative horizontal levels at which liquid exits from, and enters into, the $N^{th}$ and $N+1^{th}$ contacting stages.

In an alternative embodiment, a series of pipes could replace the downcomer segments in the annular space, with the pipes being disposed inside the vertical wall of a vapor-liquid contacting apparatus. The use of pipes, however, provides reduced flow area (and thus may require a larger overall vessel diameter) and can also result in more complex fabrication (e.g., additional welding). However, pipes can also more effectively provide a liquid seal at the wall and mitigate potential concerns with respect to liquid leakage to the immediately inferior vortex contacting stage. Those having skill in the art and knowledge of the present disclosure will appreciate the tradeoffs between using pipes or annular downcorner segment for any given vapor-liquid contacting application.

In another specific embodiment, mechanical stresses, on the vessel caused by the torque of swirling internal fluids are reduced by reversing the direction of swirl on alternating vortex contacting stages. The torques from alternating stages thereby effectively cancel each other, and the reduction in overall stress allows for the use of thinner vessel walls for the vapor-liquid contacting apparatus vessel that reduce cost.

Overall, aspects of the invention are directed to the use of one or more stages of vortex contacting to improve the performance of any number of vapor-liquid contacting apparatuses such as reactors and distillation columns. Those having skill in the art will recognize the advantages of the apparatuses, contacting stages, and associated methods described herein and their suitability in other applications. In view of the present disclosure, it will be appreciated that other advantageous results may be obtained. Those having skill in the art, with the knowledge gained from the present disclosure, will recognize that various changes can be made in the above equipment and methods without departing from the scope of the present disclosure. Mechanisms used to explain theoretical or observed phenomena or results, shall be interpreted as illustrative only and not limiting in any way the scope of the appended claims.

The invention claimed is:

1. A vapor-liquid contacting apparatus comprising a vortex contacting stage, the vortex contacting stage comprising:
   (a) a contacting zone having a circular cross section and defined between a bottom surface, a tapering inner surface, and a cylindrical tangential flow directing device disposed therebetween and proximate peripheral sections of the bottom surface and the tapering inner surface;
   (b) a vapor inlet in communication with the tangential flow directing device;
   (c) a liquid inlet in communication with the contacting zone through the bottom surface; and
   (d) a vapor-liquid disengagement device comprising an inlet surface forming a top portion of the tapering internal surface and in fluid communication with the contacting zone.

2. The contacting apparatus of claim 1, wherein the apparatus is a reactor.

3. The contacting apparatus of claim 1, wherein the apparatus is a distillation column.

4. The contacting apparatus of claim 1, wherein the inlet surface of the vapor-liquid disengagement device provides a smallest diameter at the top of the contacting zone.

5. The contacting apparatus of claim 1, wherein the vapor-liquid disengagement device further comprises:
   (d1) an opposing external outlet surface concentric with the inlet surface and having a larger diameter, and
   (d2) a bottom outlet surface.

6. The contacting apparatus of claim 5, wherein the inlet surface, the opposing external outlet surface, and the bottom outlet surface of the vapor-liquid disengagement device each comprise perforated plates.

7. The contacting apparatus of claim 1, wherein the vapor-liquid disengagement device comprises a plurality of plates maintained in a radial arrangement between slotted retention rings.

8. The apparatus of claim 5, wherein the opposing external outlet surface of the vapor-liquid disengagement device is in fluid communication with a vapor inlet of an immediately superior vortex contacting stage.

9. The apparatus of claim 5, wherein the bottom outlet surface of the vapor-liquid disengagement device is in fluid communication with a curved outer surface external to the contacting zone and opposing the tapering inner surface.

10. The apparatus of claim 9, wherein the curved outer surface terminates at a liquid downcomer in fluid communication with a liquid inlet of an immediately inferior vortex contacting stage.

11. The apparatus of claim 10, wherein the liquid downcomer extends in an annular space external to the immediately inferior vortex contacting stage.

12. The apparatus of claim 11, wherein the liquid inlet of the immediately inferior vortex contacting stage comprises one or more dip pipe conduits extending from a terminal part of the liquid downcomer.

13. The apparatus of claim 11, wherein the liquid inlet of the immediately inferior vortex contacting stage comprises a trough conduit extending from a terminal part of the liquid downcomer.

14. A method for contacting a vapor and a liquid, the method comprising feeding the vapor in the vapor inlet and feeding the liquid in the liquid inlet of the vortex contacting stage of the vapor-liquid contacting apparatus of claim 1.

15. A multi-stage vapor-liquid contacting apparatus comprising a vertically disposed cylindrical shell having a plurality of vortex contacting stages comprising:
   (a) a liquid inlet in fluid communication with the bottom surface of a contacting zone;
   (b) a vapor inlet in fluid communication with the contacting zone through a cylindrical tangential flow directing device, wherein the bottom surface, the tangential flow directing device, and a tapering inner surface above the bottom surface define the contacting zone; and
   (c) a contacting zone having a circular cross section and defined between a bottom surface, a tapering inner surface, and a cylindrical tangential flow directing device disposed therebetween and proximate peripheral sections of the bottom and the tapering inner surfaces; and
   (d) a vapor-liquid disengagement device comprising an inlet surface forming a top portion of the tapering internal surface and in fluid communication with the contacting zone.

16. The multi-stage vapor-liquid contacting apparatus of claim 15, wherein the vapor-liquid disengagement device further comprises:
   (d1) an opposing external outlet surface concentric with the internal surface and in fluid communication with a vapor inlet of an immediately superior vortex contacting stage, and
   (d2) a bottom outlet surface in fluid communication with an outer surface external to the contacting zone and opposing the tapering inner surface,
wherein the outer surface terminates at a plurality of liquid downcomer segments extending in discreet sections of an annular space external to the plurality of vortex contacting stages and disposed radially between liquid downcomer segments of the immediately superior and immediately inferior vortex contacting stages.

17. The multi-stage vapor-liquid contacting apparatus of claim 15, wherein cylindrical tangential flow directing devices are arranged to reverse a direction of vortex swirl on successive vortex contacting stages in an alternating manner.

18. The apparatus of claim 16, wherein the liquid inlet of the immediately inferior vortex contacting stage comprises one or more dip pipe conduits extending from each terminal part of the plurality of liquid downcomer segments.

19. The apparatus of claim 16, wherein the liquid inlet of the immediately inferior vortex contacting stage comprises one or more trough conduits extending from each terminal part of the plurality of liquid downcomer segments.

* * * * *